United States Patent
Dayan

(10) Patent No.: US 10,388,180 B1
(45) Date of Patent: Aug. 20, 2019

(54) FINGER RESTRAINING DEVICE FOR KEYBOARD

(71) Applicant: Dalia Dayan, Bethpage, NY (US)

(72) Inventor: Dalia Dayan, Bethpage, NY (US)

(*) Notice: Subject to any disclaimer, the term of this patent is extended or adjusted under 35 U.S.C. 154(b) by 233 days.

(21) Appl. No.: 15/627,984

(22) Filed: Jun. 20, 2017

(51) Int. Cl.
- *G09B 15/06* (2006.01)
- *A63B 21/02* (2006.01)
- *A63B 21/055* (2006.01)
- *A63B 21/00* (2006.01)
- *A63B 23/16* (2006.01)

(52) U.S. Cl.
CPC .............. *G09B 15/06* (2013.01); *A63B 21/02* (2013.01); *A63B 21/0552* (2013.01); *A63B 21/4025* (2015.10); *A63B 23/16* (2013.01)

(58) Field of Classification Search
CPC ........ G09B 15/00; G09B 15/02; G09B 15/04; G09B 15/06
See application file for complete search history.

(56) References Cited

U.S. PATENT DOCUMENTS

| | | | | |
|---|---|---|---|---|
| 248,980 A * | 11/1881 | Atkins | A63B 23/16 482/48 |
| 272,951 A * | 2/1883 | Gardner | A63B 23/16 482/48 |
| 494,197 A * | 3/1893 | Hall | A63B 23/16 482/48 |
| 867,981 A * | 10/1907 | Krizek | A63B 23/16 482/48 |
| 897,471 A | 9/1908 | Loyola | |
| 1,126,938 A * | 2/1915 | Barrett | G09B 15/06 473/61 |
| 1,736,930 A * | 11/1929 | Marsh | A63B 23/16 482/48 |
| 2,108,236 A * | 2/1938 | Scott | A61F 5/10 473/61 |
| 2,222,180 A * | 11/1940 | Marsh | A63B 23/16 132/73 |
| 4,765,608 A * | 8/1988 | Bonasera | A63B 23/16 482/124 |
| 5,261,393 A * | 11/1993 | Weinzweig | A61H 1/0288 2/21 |
| 5,514,052 A * | 5/1996 | Charles | A63B 21/0552 482/121 |
| 5,631,861 A * | 5/1997 | Kramer | G06F 3/011 414/5 |
| 5,820,577 A * | 10/1998 | Taylor | A63B 21/0004 601/40 |
| 6,371,932 B1 * | 4/2002 | Foote | A61F 5/0102 128/880 |
| 6,982,375 B2 | 1/2006 | McGregor | |
| 7,601,130 B2 * | 10/2009 | Farrell | A63B 23/16 602/20 |
| 7,731,633 B1 | 6/2010 | Williams | |

* cited by examiner

*Primary Examiner* — Joshua Lee
(74) *Attorney, Agent, or Firm* — Peter A. Hurley; Richard L. Miller

(57) ABSTRACT

A teaching device that teaches a user how to properly use a piano keyboard by restraining the fingers of a hand of the user in a specifically bent orientation. The teaching device includes a wrist band and a restrainer arrangement. The wrist band wraps around the wrist of the hand of the user. The restrainer arrangement is operatively connected to the wrist band and engages the fingers of the hand of the user to teach the user how to properly use the piano keyboard by restraining the fingers of the hand of the user in the specifically bent orientation.

37 Claims, 3 Drawing Sheets

FINGER RESTRAINING DEVICE FOR KEYBOARD

BACKGROUND OF THE INVENTION

Field of the Invention

The present invention relates to a finger restraining device, and more particularly, a finger restraining device for keyboard.

Description of the Prior Art

Numerous innovations for hand devices have been provided in the prior art that will be described. Even though these innovations may be suitable for the specific individual purposes to which they address, however, they differ from the present invention.

A FIRST EXAMPLE, U.S. Pat. No. 897,471, Published/Issued on Sep. 1, 1908, to Loyola teaches an apparatus including a series of rings adapted to be slipped over the fingers and thumb, weights detachably secured to the ringer rings, and connecting arms embodying articulate sections of which the forward one has a vertically swinging connection with the rear one. The forward sections are secured to the rings and of which the rear sections have a laterally swinging connection with the wrist band. Further included is a wrist band to which the rear sections are secured.

A SECOND EXAMPLE, U.S. Pat. No. 2,222,180, Published/Issued on Nov. 19, 1940, to Marsh teaches a finger exercising device including a wrist band and an arm band resiliently connected together, and a plurality of elastic loops extending from the wrist band. Each loop includes opposing longitudinal strands and a bight. Further included a substantially semi-circular clip having an eye at each end slidably attached to each loop on opposite sides of the bight whereby the loop is adapted to tighten the clip and the bight of the loop onto a finger of the wearer against rotational slip or longitudinal movement.

A THIRD EXAMPLE, U.S. Pat. No. 4,765,608, Published/Issued on Aug. 23, 1988, to Bonasera teaches a device designed to fit on the wrist and fingers of a musician, so as to develop the hand and fingers for better speed and coordination. Primarily, it includes a fork secured to the wrist of the user, and tines of the fork are provided with sleeves having resilient components attached for applying tension to the fingers. The device further includes hook and loop fastener straps for securing the components to the fingers of the musician, and the main body of the fork is received in a wrist band attached to the musician's wrist.

A FOURTH EXAMPLE, U.S. Pat. No. 6,982,375, Published/Issued on Jan. 3, 2006, to McGregor teaches a musical teaching device having a carriage to be placed in juxtaposition with a piano keyboard. The carriage has a pair of gloves slidably attached to move along the length of the carriage. The fingers of the gloves include signaling devices to indicate proper movement. The carriage and gloves are connected to a controller that commands proper hand positioning and finger movement to play a musical score loaded in the controller. The controller is powered by a computer program.

A FIFTH EXAMPLE, U.S. Pat. No. 7,731,633, Published/Issued on Jun. 8, 2010, to Williams teaches an exercise glove for intrinsic muscles and method of use. The exercise glove incorporates rigid ribs having rib distal end angles corresponding to patient metacarpal phalangeal joint angles. The ribs passively hold the patient metacarpal phalangeal joint angles in extension, while the patient actively flexes the proximal interphalangeal joints and distal interphalangeal joints to obtaining optimal intrinsic muscle stretching. The rib distal end angles may be set by a physical therapist to correspond to individual patient metacarpal phalangeal joint angles, or alternately, an array of ribs of different rib distal end angles may be provided with the exercise glove from which rib assortment the physical therapist may choose ribs having appropriate rib distal end angles ribs to attach to the exercise glove. The method includes the steps of using the exercise glove to passively hold metacarpal phalangeal joints in extension, while actively flexing proximal and distal interphalangeal joints.

It is apparent now that numerous innovations for hand devices have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a finger restraining device for keyboard that avoids the disadvantages of the prior art.

ANOTHER OBJECT of the present invention is to provide a finger restraining device for keyboard that is simple and inexpensive to manufacture.

STILL ANOTHER OBJECT of the present invention is to provide a finger restraining device for keyboard that is simple to use.

BRIEFLY STATED, STILL YET ANOTHER OBJECT of the present invention is to provide a teaching device that teaches a user how to properly use a piano keyboard by restraining the fingers of a hand of the user in a specifically bent orientation. The teaching device includes a wrist band and a restrainer arrangement. The wrist band wraps around the wrist of the hand of the user. The restrainer arrangement is operatively connected to the wrist band and engages the fingers of a hand of the user to teach the user how to properly use the piano keyboard by restraining the fingers of the hand of the user in the specifically bent orientation.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWINGS

The figures of the drawings are briefly described as follows.

A MARSHALING OF REFERENCE NUMERALS UTILIZED IN THE DRAWINGS

Figure 1:
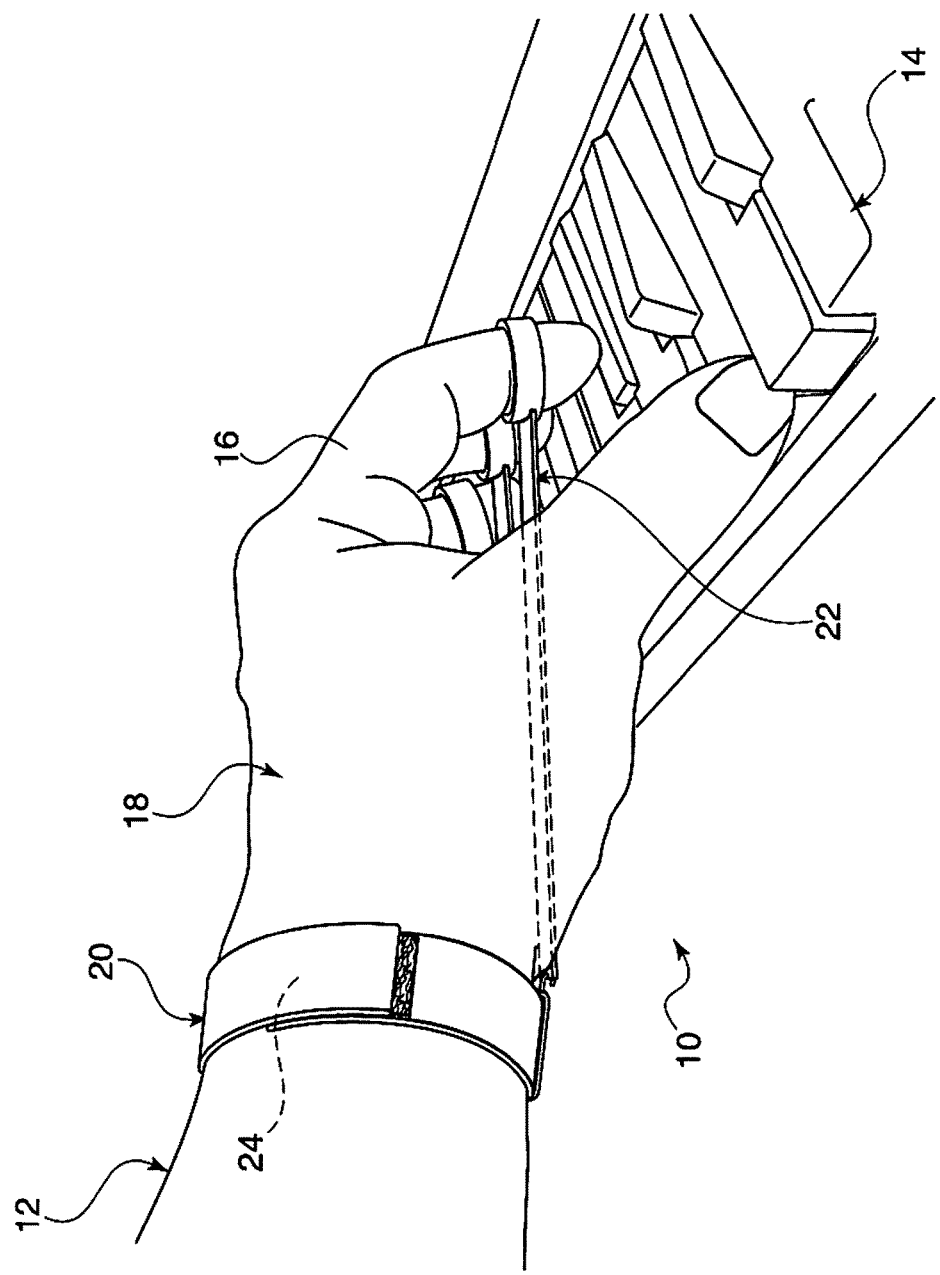
FIG. 1 is a diagrammatic perspective view showing the finger restraining device for keyboard donned on a pianist's hand.

Introductory 10 teaching device of embodiments of present invention for teaching user 12 how to properly use piano keyboard 14 by restraining fingers 16 of hand 18 of user 12 in specifically bent orientation
12 user
14 piano keyboard
16 fingers of hand 18 of user 12
18 hand of user 12

Overall Configuration of Teaching Device 10

20 wrist band for wrapping around wrist 24 of hand 18 of user 12
22 restrainer arrangement for engaging fingers 16 of hand 18 of user 12 for teaching user 12 how to properly use piano keyboard 14 by restraining fingers 16 of hand 18 of user 12 in specifically bent orientation

Specific Configuration of Wrist Band 20 and Restrainer Apparatus 22

Wrist Band 20

24 inner surface of wrist band 20
26 outer surface of wrist band 20
28 pair of ends of wrist band 20
30 mating portions of hook and loop pile fasteners of wrist band 20 for allowing wrist band 20 to fit differently sized wrists 24 of different users 12

Restrainer Arrangement 22

32 four holders of restrainer arrangement 22
34 four loops of four holders 32 of restrainer arrangement 22, respectively
36 working ends of four loops 34 of four holders 32 of restrainer arrangement 22, respectively
38 four hooks of restrainer arrangement 22 for extending towards fingers 16 of hand 18 of user 12
40 four strips of restrainer arrangement 22
42 proximal ends of four strips 40 of restrainer arrangement 22, respectively
44 distal ends of four strips 40 of restrainer arrangement 22, respectively
46 four rings of four strips 40 of restrainer arrangement 22, respectively, for receiving fingers 16 of hand 18 of user 12, respectively
48 plurality of through bores 48 of four strips 40 of restrainer arrangement 22, respectively

DETAILED DESCRIPTION OF THE PREFERRED EMBODIMENT

Introductory

Referring now to the figures, in which like numerals indicate like parts, and particularly to FIG. 1, the teaching device of the embodiments of the present invention is shown generally at 10 for teaching a user 12 how to properly use a piano keyboard 14 by restraining the fingers 16 of a hand 18 of the user 12 in a specifically bent orientation.

Overall Configuration of the Teaching Device 10

Figure 2:
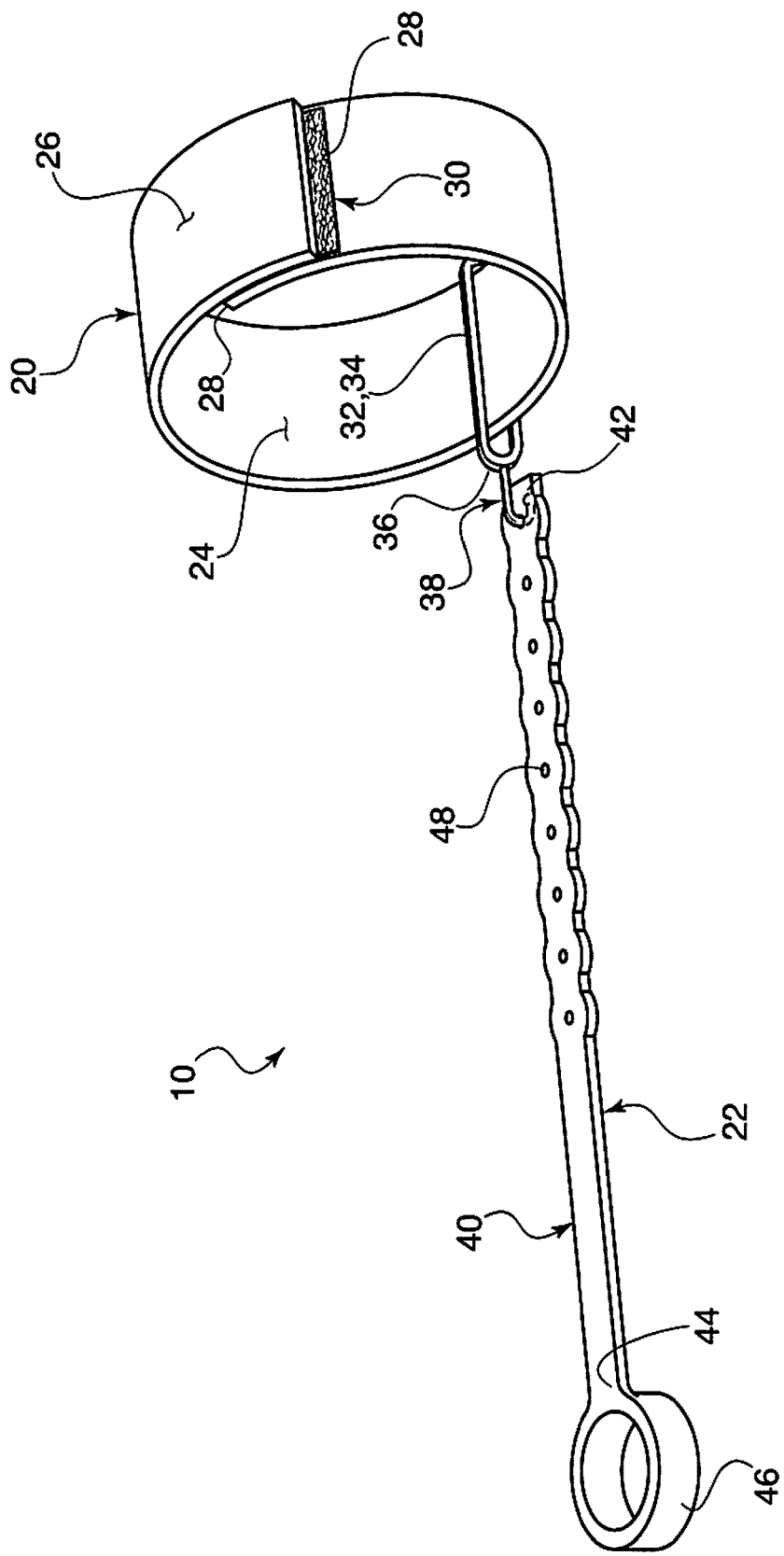
FIG. 2 is a diagrammatic perspective view illustrating just a single restraining component per se attached to a wrist band.
Figure 3:
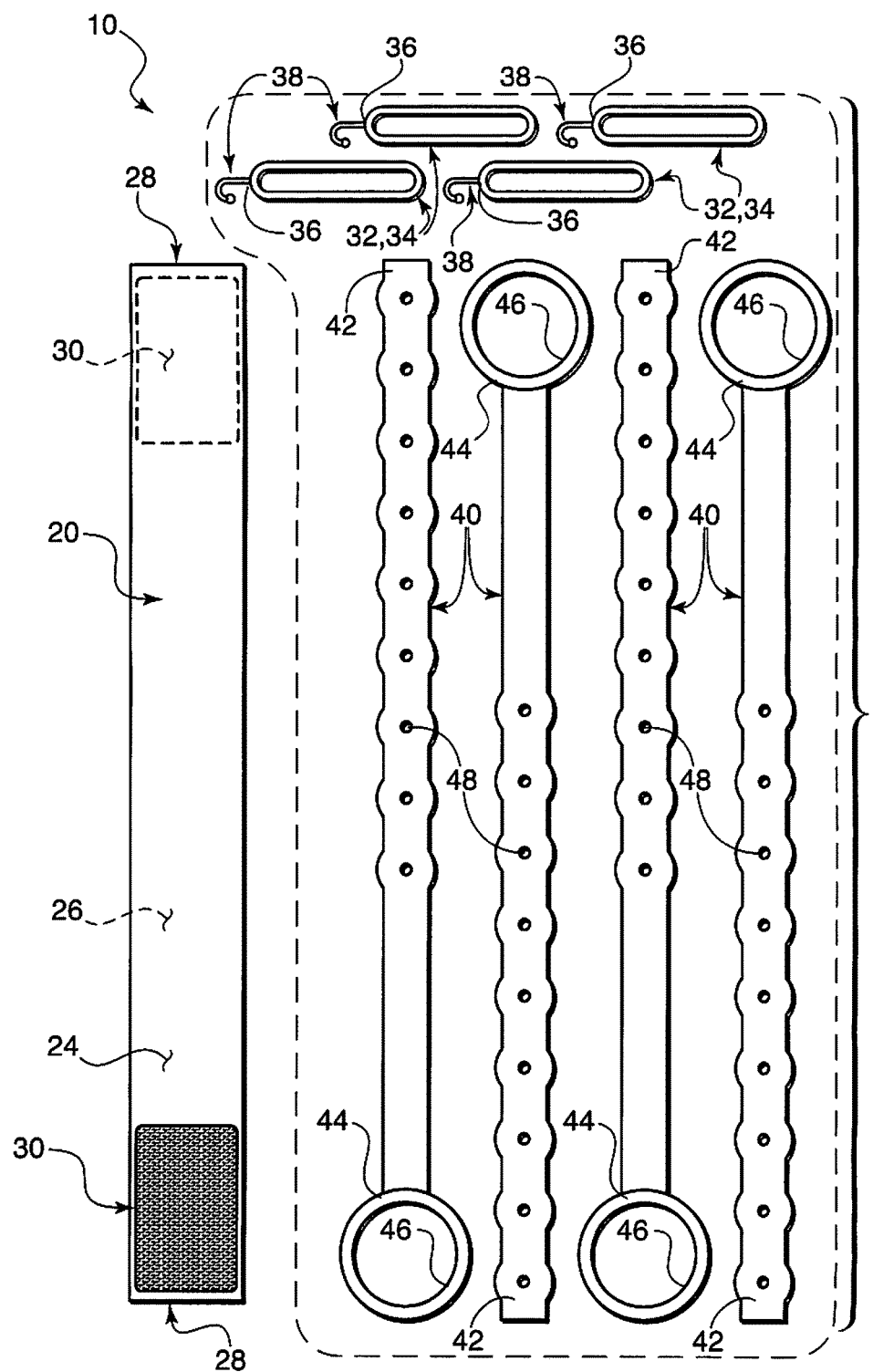
FIG. 3 is a plan elevational view of all the required components to be used for all the fingers of just one hand of a pianist.

The overall configuration of the teaching device 10 can best be seen in FIGS. 1-3, and as such, will be discussed with reference thereto.

The teaching device 10 comprises a wrist band 20 and a restrainer arrangement 22. The wrist band 20 is for wrapping around the wrist 24 of the hand 18 of the user 12. The restrainer arrangement 22 is operatively connected to the wrist band 22 and is for engaging the fingers 16 of the hand 18 of the user 12 for teaching the user 12 how to properly use the piano keyboard 14 by restraining the fingers 16 of the hand 18 of the user 12 in the specifically bent orientation.

Specific Configuration of the Wrist Band 20 and the Restrainer Apparatus 22

The specific configuration of the wrist band 20 and the restrainer apparatus 22 can best be seen in FIGS. 2 and 3, and as such, will be discussed with reference thereto.

Wrist Band 20

The wrist band 20 is slender, elongated, flat, and rectangular-shaped.

The wrist band 20 has an inner surface 24, an outer surface 26, a pair of ends 28, and mating portions of hook and loop pile fasteners 30.

The mating portions of hook and loop file fasteners 30 of the wrist band 20 allow the wrist band 20 to be adjustable for fitting different sized wrists 24 of different users 12.

The mating portions of hook and loop file fasteners 30 of the wrist band 20 are disposed at the pair of ends 28 of the wrist band 20, respectively.

One portion of the mating portions of hook and loop file fasteners 30 of the wrist band 20 is disposed on the inner surface 24 of the wrist band 20 and the other portion of the mating portions of hook and loop file fasteners 30 of the wrist band 20 is disposed on the outer surface 26 of the wrist band 20.

Restrainer Arrangement 22

The restrainer arrangement 22 comprises four holders 32.

The four holders 32 of the restrainer arrangement 22 are separate from each other, are identical to each other, are four loops 34, and are made from plastic.

The four loops 34 of the four holders 32 of the restrainer arrangement 22 have working ends 36, respectively, and are narrow enough to just receive the wrist band 20 for eliminating discomfort to the wrist 24 of the hand 18 of the user 12 caused by the four loops 34 of the four holders 32 of the restrainer arrangement 22.

The restrainer arrangement 22 further comprises four hooks 38.

The four hooks 38 of the restrainer arrangement 22 are slender, are made from metal, are identical to each other, are separate from each other, are affixed to the working ends 36 of the four loops 34 of the four holders 32 of the restrainer arrangement 22, respectively, and are for extending towards the fingers 16 of the hand 18 of the user 12.

The restrainer arrangement 22 further comprises four strips 40.

The four strips 40 of the restrainer arrangement 22 are slender, elongated, identical to each other, separate from each other, made from rubber, and have proximal ends 42 and distal ends 44, respectively.

The four strips 40 of the restrainer arrangement 22 further have four rings 46, respectively.

The four rings 46 of the four strips 40 of the restrainer arrangement 22 are identical to each other, are separate from each other, are affixed to the distal ends 44 of the four strips 40 of the restrainer arrangement 22, respectively, and are for receiving the fingers 16 of the hand 18 of the user 12, respectively.

The four strips 40 of the restrainer arrangement 22 further have lengths and a plurality of through bores 48, respectively.

The plurality of through bores 48 of the four strips 40 of the restrainer arrangement 22 are spaced-apart along the four strips 40 of the restrainer arrangement 22, respectively, from the proximal ends 42 of the four strips 40 of the restrainer arrangement 22, respectively, to approximately ⅔ of the lengths of the four strips 40 of the restrainer arrangement 22, respectively, to thereby leave approximately ⅓ of the lengths of the four strips 40 of the restrainer arrangement 22, respectively, solid for extending under the fingers 16 of the hand 18 of the user 12.

Four desired ones of the plurality of through bores 48 of the four strips 40 of the restrainer arrangement 22, respectively, receive the four hooks 38 of the restrainer arrangement 22, respectively, for controlling an amount of restraining of the fingers 16 of the hand 18 of the user 12 to the specifically bent orientation.

The four strips 40 of the restrainer arrangement 22 are circularly widened at each of the plurality of through bores 48 of the four strips 40 of the restrainer arrangement 22, respectively, for adding strength when the four strips 40 of the restrainer arrangement 22 are pulled upon during the retraining process.

Impressions

It will be understood that each of the elements described above, or two or more together, may also find a useful application in other types of constructions differing from the types described above.

While the invention has been illustrated and described as embodiments of a finger restraining device for keyboard, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A teaching device for teaching a user how to properly use a piano keyboard by restraining the fingers of a hand of the user in a specifically bent orientation, comprising:
  a) a wrist band; and
  b) a restrainer arrangement;
  wherein said wrist band is for wrapping around the wrist of the hand of the user;
  wherein said restrainer arrangement is operatively connected to said wrist band;
  wherein said restrainer arrangement is for engaging the fingers of the hand of the user for teaching the user how to properly use the piano keyboard by restraining the fingers of the hand of the user in the specifically bent orientation;
  wherein said restrainer arrangement comprises four holders;
  wherein said four holders of said restrainer arrangement are four loops;
  wherein said four loops of said four holders of said restrainer arrangement having working ends, respectively;
  wherein said restrainer arrangement comprises four hooks;
  wherein said restrainer arrangement comprises four strips;
  wherein said four strips of said restrainer arrangement have proximal ends, respectively; and
  wherein said four strips of said restrainer arrangement have a plurality of th rough bores, respectively.

2. The teaching device of claim 1, wherein said wrist band is slender.

3. The teaching device of claim 1, wherein said wrist band is elongated.

4. The teaching device of claim 1, wherein said wrist band is flat.

5. The teaching device of claim 1, wherein said wrist band is rectangular-shaped.

6. The teaching device of claim 1, wherein said wrist band has an inner surface.

7. The teaching device of claim 6, wherein said wrist band has an outer surface.

8. The teaching device of claim 7, wherein said wrist band has a pair of ends.

9. The teaching device of claim 8, wherein said wrist band has mating portions of hook and loop pile fasteners.

10. The teaching device of claim 9, wherein said mating portions of hook and loop file fasteners of said wrist band allows said wrist band to be adjustable for fitting different sized wrists of different users.

11. The teaching device of claim 9, wherein said mating portions of hook and loop file fasteners of said wrist band are disposed at said pair of ends of said wrist band, respectively.

12. The teaching device of claim 11, wherein one portion of said mating portions of hook and loop file fasteners of said wrist band is disposed on said inner surface of said wrist band.

13. The teaching device of claim 12, wherein the other portion of said mating portions of hook and loop file fasteners of said wrist band is disposed on said outer surface of said wrist band.

14. The teaching device of claim 1, wherein said four holders of said restrainer arrangement are separate from each other.

15. The teaching device of claim 1, wherein said four holders of said restrainer arrangement are identical to each other.

16. The teaching device of claim 1, wherein said four holders of said restrainer arrangement are made from plastic.

17. The teaching device of claim 1, wherein said four loops of said four holders of said restrainer arrangement are narrow enough to just receive said wrist band for eliminating discomfort to the wrist of the hand of the user caused by said four loops of said four holders of said restrainer arrangement.

18. The teaching device of claim 1, wherein said four hooks of said restrainer arrangement are slender.

19. The teaching device of claim 1, wherein said four hooks of said restrainer arrangement are made from metal.

20. The teaching device of claim 1, wherein said four hooks of said restrainer arrangement are identical to each other.

21. The teaching device of claim 1, wherein said four hooks of said restrainer arrangement are affixed to said working ends of said four loops of said four holders of said restrainer arrangement, respectively, for extending towards the fingers of the hand of the user.

22. The teaching device of claim 1, wherein said four strips of said restrainer arrangement are slender.

23. The teaching device of claim 1, wherein said four strips of said restrainer arrangement are elongated.

24. The teaching device of claim 1, wherein said four strips of said restrainer arrangement are identical to each other.

25. The teaching device of claim 1, wherein said four strips of said restrainer arrangement are separate from each other.

26. The teaching device of claim 1, wherein said four strips of said restrainer arrangement are made from rubber.

27. The teaching device of claim 1, wherein said four strips of said restrainer arrangement have distal ends, respectively.

28. The teaching device of claim 27, wherein said four strips of said restrainer arrangement have four rings, respectively.

29. The teaching device of claim 28, wherein said four rings of said four strips of said restrainer arrangement are identical to each other.

30. The teaching device of claim 28, wherein said four rings of said four strips of said restrainer arrangement are separate from each other.

31. The teaching device of claim 28, wherein said four rings of said four strips of said restrainer arrangement are affixed to said distal ends of said four strips of said restrainer arrangement, respectively, and are for receiving the fingers of the hand of the user, respectively.

32. The teaching device of claim 1, wherein said four strips of said restrainer arrangement have lengths, respectively.

33. The teaching device of claim 1, wherein said plurality of through bores of said four strips of said restrainer arrangement are spaced-apart along said four strips of said restrainer arrangement, respectively.

34. The teaching device of claim 32, wherein said plurality of through bores of said four strips of said restrainer arrangement are spaced-apart along said four strips of said restrainer arrangement, respectively, from said proximal ends of said four strips of said restrainer arrangement, respectively, to approximately ⅔ of said lengths of said four strips of said restrainer arrangement, respectively, to thereby leave approximately ⅓ of said lengths of said four strips of said restrainer arrangement, respectively, solid for extending under the fingers of the hand of the user.

35. The teaching device of claim 1, wherein four desired ones of said plurality of through bores of said four strips of said restrainer arrangement, respectively, receive said four hooks of said restrainer arrangement, respectively, for controlling the restraining of the fingers of the hand of the user to the specifically bent orientation.

36. The teaching device of claim 1, wherein said four strips of said restrainer arrangement are circularly widened at each of said plurality of through bores of said four strips of said restrainer arrangement, respectively, for adding strength when said four strips of said restrainer arrangement are pulled upon during the retraining process.

37. The teaching device of claim 1, wherein said four hooks of said restrainer arrangement are separate from each other.

* * * * *